US011472646B2

(12) United States Patent
Kibbe et al.

(10) Patent No.: US 11,472,646 B2
(45) Date of Patent: *Oct. 18, 2022

(54) DISCHARGE SPREADER FOR GRAIN BIN

(71) Applicant: The GSI Group, LLC, Assumption, IL (US)

(72) Inventors: Shaun J. Kibbe, Sabetha, KS (US); Austin D. Wasinger, Sabetha, KS (US); James H. Renyer, Sabetha, KS (US)

(73) Assignee: The GSI GROUP LLC, Assumption, IL (US)

( * ) Notice: Subject to any disclaimer, the term of this patent is extended or adjusted under 35 U.S.C. 154(b) by 482 days.

This patent is subject to a terminal disclaimer.

(21) Appl. No.: 16/664,325

(22) Filed: Oct. 25, 2019

(65) Prior Publication Data

US 2020/0130965 A1 Apr. 30, 2020

Related U.S. Application Data

(60) Provisional application No. 62/752,601, filed on Oct. 30, 2018.

(51) Int. Cl.
*B65G 69/04* (2006.01)
*A01F 25/18* (2006.01)
*B65D 88/54* (2006.01)

(52) U.S. Cl.
CPC ........ *B65G 69/0441* (2013.01); *A01F 25/186* (2013.01); *B65D 88/54* (2013.01); *B65G 2814/027* (2013.01)

(58) Field of Classification Search
CPC .............. A01F 25/186; B65G 69/0441; B65G 2814/027

USPC ......................................................... 414/299
See application file for complete search history.

(56) References Cited

U.S. PATENT DOCUMENTS

| 3,045,840 | A | * | 7/1962 | Donelson, Jr. | ..... B65G 69/0458 |
| | | | | | 198/642 |
| 4,437,613 | A | | 3/1984 | Olson | |
| 4,902,185 | A | | 2/1990 | Dixon et al. | |

(Continued)

FOREIGN PATENT DOCUMENTS

CA 2251180 A1 4/2000

OTHER PUBLICATIONS

UK Intellectual Property Office, Search Report for related UK Application No. GB 1819858.0, dated May 29, 2019.

*Primary Examiner* — James Keenan

(57) ABSTRACT

A grain spreader includes a hopper and spreader arms that distribute grain in a bin with a spreader cone having convergent divergent cones. The convergent cone forms a first flow zone. A center opening between the convergent cone and divergent cone allows a first portion of grain collecting in the convergent cone to pass through the spreader cone. An intermediate funnel is inside the hopper body between the convergent cone and the hopper body. A second portion of the grain spills over the rim of the convergent cone and onto the divergent cone into a second flow zone outside the convergent cone but inside the intermediate funnel. When the second zone fills with grain, a further portion of grain will spill over a rim of the intermediate funnel into a third flow zone radially outward of the intermediate funnel but inside the hopper body.

14 Claims, 7 Drawing Sheets

(56) References Cited

U.S. PATENT DOCUMENTS

| | | | |
|---|---|---|---|
| 6,991,415 B1 * | 1/2006 | Anschultz | B65G 69/0441 414/299 |
| 8,708,632 B2 * | 4/2014 | Toline | A01F 25/186 414/300 |
| 2008/0219817 A1 | 9/2008 | Halland et al. | |
| 2020/0128755 A1 * | 4/2020 | Kibbe | B65G 69/0441 |

* cited by examiner

DISCHARGE SPREADER FOR GRAIN BIN

CROSS REFERENCE TO RELATED APPLICATION

This application claims the benefit of U.S. Provisional Application No. 62/752,601, filed Oct. 30, 2018, which is hereby incorporated by reference in its entirety.

BACKGROUND OF THE INVENTION

Field of Invention

This invention relates generally to storage and processing facilities for material such as grain, and more particularly to a discharge system for controlling the flow and distribution of a material being fed into a storage bin.

Description of Related Art

Storage bins are used to receive and store materials such as grain and the like. Such grain storage bins are often filled through a bin opening near the top of the bin with a grain auger or conveyor. FIG. 1 illustrates an exemplary grain storage bin of the prior art with a grain auger feeding grain into the bin.

As shown in FIG. 1, one challenge in feeding grain through an unregulated bin opening is the inherent nature of an auger or conveyor to introduce the grain off-center into the storage area. This can result in uneven distribution of the materials within the bottom of the bin. This higher volume flow of grain off to one side prevents the bin from efficiently storing materials. This may also lead to uneven weight distribution within the storage bin, which could affect the structural stability of the bin.

OVERVIEW OF THE INVENTION

In one embodiment, the invention is directed to a grain spreader for a storage bin that receives grain from a spout through a bin inlet. The grain spreader includes a hopper that receives grain from the spout and a plurality of spreader arms extending generally radially from the hopper configured to distribute the grain in the storage bin. The hopper has a body forming a constricted outlet at a bottom end of the hopper body. The grain spreader further includes a spreader cone, wherein grain received in the hopper is directed to the plurality of spreader arms through the outlet with the spreader cone. The spreader cone has an upper portion having a convergent cone and lower portion having a divergent cone connected at a middle union. The spreader cone is positioned partially within the body of the hopper such that an upper rim of the convergent cone is within and coaxially aligned with the hopper body, and a bottom or distribution end of the divergent cone is suspended below the outlet of the hopper. Grain being fed into the hopper falls into the convergent cone and an interior of the convergent cone forms a first flow zone, wherein the spreader cone has a center opening between the convergent cone and divergent cone that allows a first portion of the grain collecting in the convergent cone to pass through the interior of the spreader cone and fall through the underside of the divergent cone. The spreader cone also has an intermediate funnel inside the hopper body and positioned between the convergent cone and the hopper body. A second portion of the grain collecting in the convergent cone spills over the rim of the convergent cone and onto an upper surface of the divergent cone into a second flow zone located radially outside the convergent cone but inside the intermediate funnel. When the second zone fills with grain, a further portion of the grain will spill over a rim of the intermediate funnel into a third flow zone located radially outward of the intermediate funnel but inside the hopper body.

The flow zones direct the flow of grain such that when grain builds up more on one side of the hopper, grain is redirected to the other side of the hopper to cause the grain to flow evenly onto the divergent cone.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
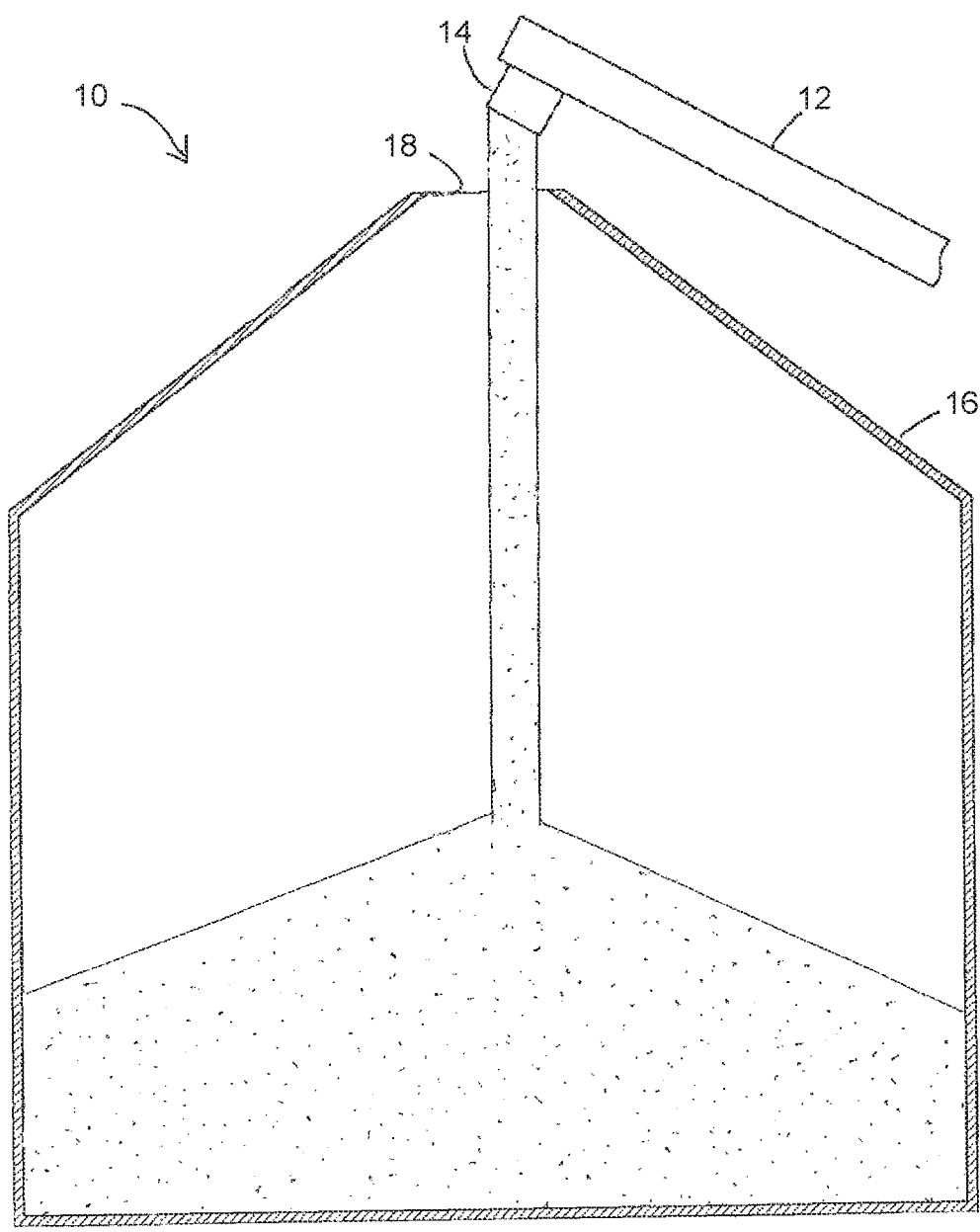
FIG. 1 is a sectional view of a grain storage bin being loaded via a prior art method and system.

FIG. 1 illustrates a material storage system 10 configured to stockpile and store material such as grain and the like. As is known in the art, the material storage system 10 has an elevator 12 with a spout 14 leading to a storage bin 16. The storage bin 16 includes a bin inlet 18 through which material is fed by the elevator 12. One will understand that the storage bin 16 may be any tank, silo or other structure, either freestanding or relying on common architecture, used to store a material such as grain. It should be appreciated that the bin inlet 18 may be positioned at various locations on the material storage bin 16, but is desirably in an upper portion of the material storage bin 16 as shown in the exemplary figure. In one embodiment, the elevator 12 conveys the grain in a direction having a vertical component so as to change the elevation of the grain so that gravity may be used to move the grain. For example, the elevator 12 may comprise an auger, a bucket conveyor having a plurality of buckets, a pneumatic conveyor, or other known configuration to move grain to the storage bin 16. The following disclosure will describe the invention referring to the material as grain, but it is to be understood that the system may be used with materials other than grain without departing from the scope of the invention.

Figure 2:
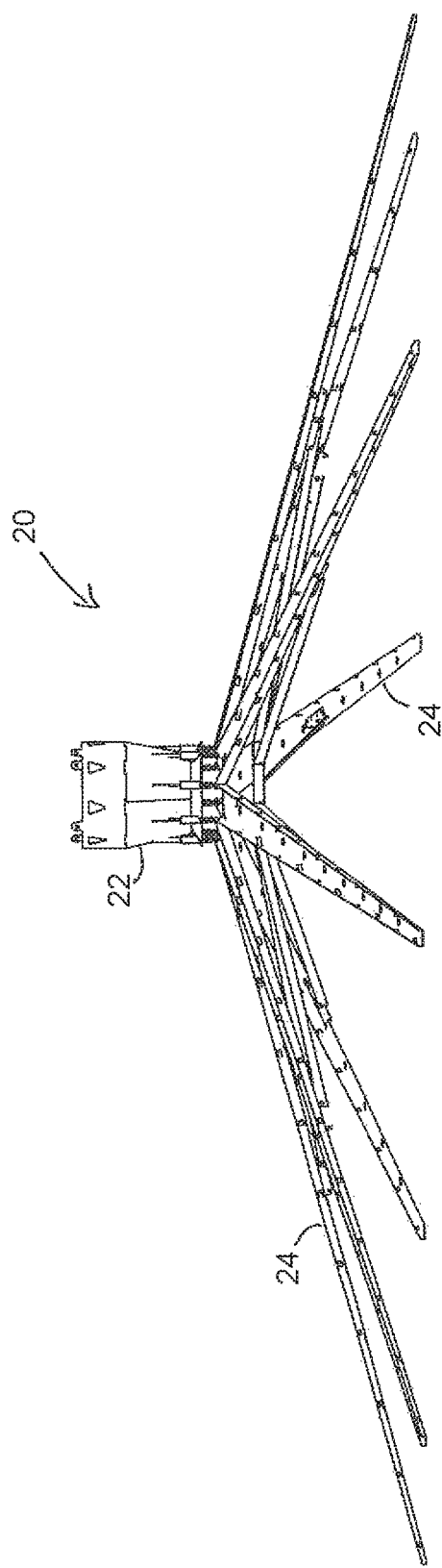
FIG. 2 is a perspective view of a discharge spreader system in accordance with an example embodiment.
Figure 3:
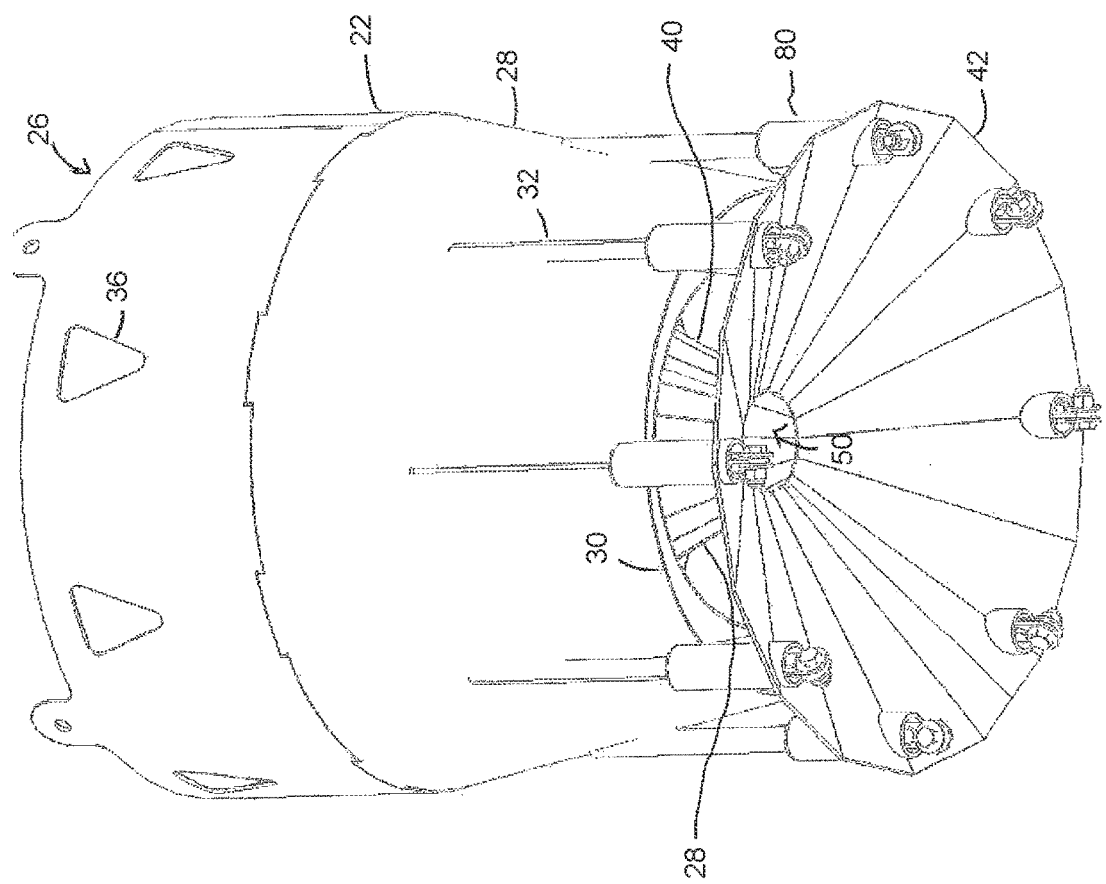
FIG. 3 is an enlarged perspective view of a receiving hopper of the discharge spreader system of FIG. 2.
Figure 4:
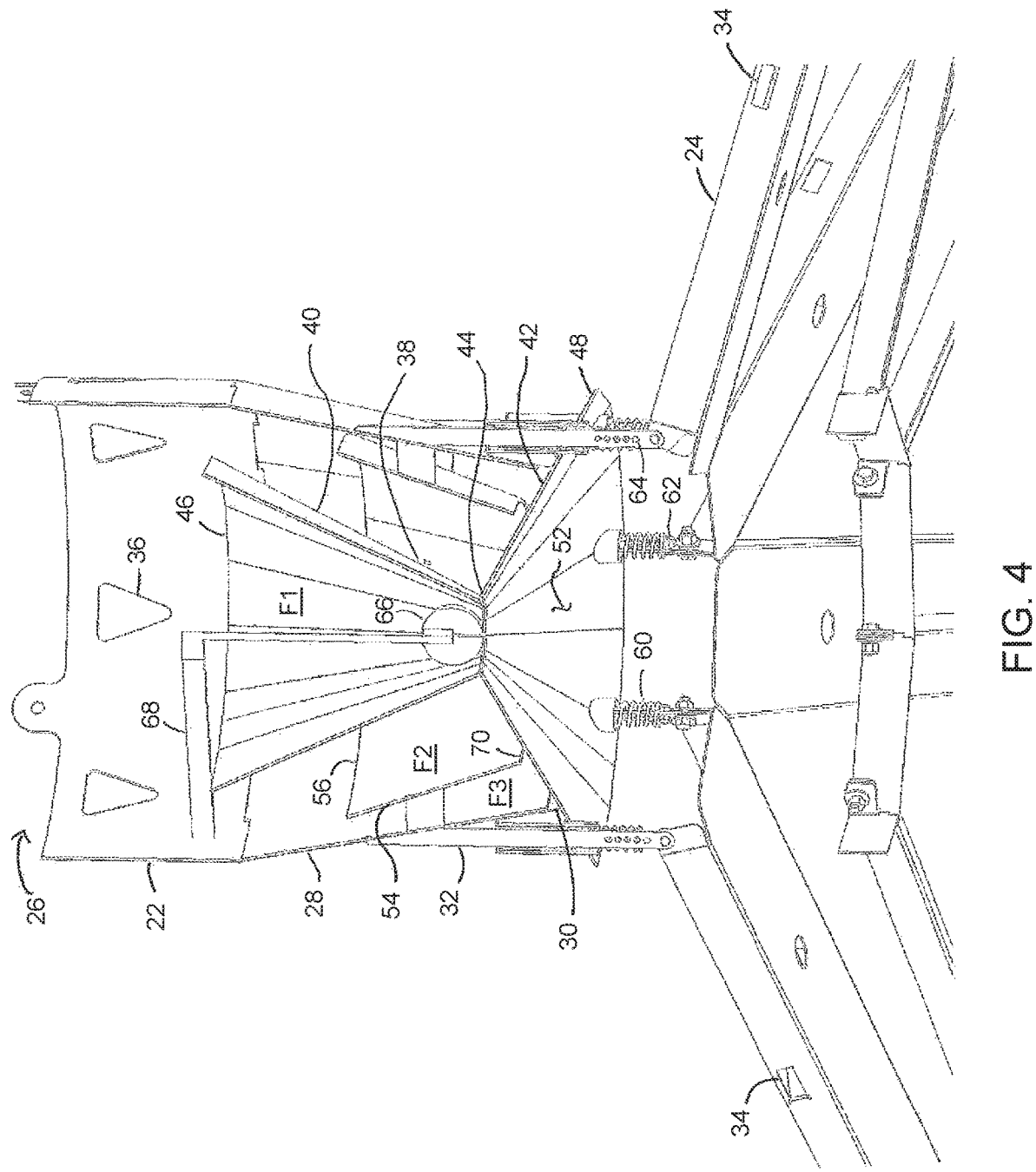
FIG. 4 is a cut-away perspective view of a portion of the receiving hopper of FIG. 3 in accordance with an example embodiment.

FIG. 2 illustrates a grain spreader 20 according to an embodiment of the invention that can be suspended beneath the bin inlet 18 of the material storage system 10 (FIG. 1). It is desirable that the grain spreader 20 be installed in the top, center of the storage bin 16 under the inlet 18 to evenly distribute grain using gravity in all directions around the inlet 18. The grain spreader 20 includes a hopper 22 that receives grain from the spout 14 (FIG. 1) and a plurality of spreader arms 24 extending generally radially from the hopper 22. Turning also now to FIGS. 3 and 4, the hopper 22 has an upward facing mouth 26 and a frustoconical hopper body 28 forming a constricted outlet 30 at the bottom end of the hopper body 28. The spreader arms 24 are hung from and supported by the body of the hopper 22 using a plurality of support rods 32. The spreader arms 24 have multiple spill ports 34 along their length that allow the grain to fall from the spreader arms 24 to the pile of grain forming in the bin 16 and be distributed across a subtidal portion of the footprint of the grain bin 16. In one embodiment, overflow ports 36 are positioned directly over spreader arms 24 so any overflow of the hopper 22 will be distributed outward by the spreader arms 24.

According to the invention, grain received in the hopper 22 is directed to the plurality of spreader arms 24 through the outlet 30 by introducing and maintaining the flow of grain through adjustable flow zones with the use of a spreader cone 38 as will be described below. In the illustrated embodiment, the spreader cone 38 is a weldment having an upper portion comprising a convergent cone 40 and lower portion comprising a divergent cone 42 connected at a middle union 44. The spreader cone 38 is positioned partially within the body 28 of the hopper 22 such that an upper rim 46 of the convergent cone 40 is within and coaxially aligned with the hopper body 28, and a bottom or distribution end 48 of the divergent cone 42 is suspended below the outlet 30 of the hopper 22. Grain being fed into the hopper 22 from the elevator 12 primarily falls into the convergent cone 40. The interior of the convergent cone 40 forms a first flow zone F1. A center opening 50 (best seen in FIG. 3) at the union 44 of the convergent cone 40 and divergent cone 42 allows a first portion of the grain collecting in the convergent cone 40 to pass through the interior of the spreader cone 38 and fall through the underside of the divergent cone 42. After the convergent cone 40 is filled with grain, a second portion of the grain collected in the convergent cone 40 spills over the rim 46 of the convergent cone 40 and onto an upper surface 52 of the divergent cone 42.

The grain spreader 20 further incorporates an intermediate funnel 54 inside the hopper body 28 and positioned between the convergent cone 40 and the hopper body 28. The intermediate funnel 54 is desirably positioned substantially concentric with the convergent cone 40 and the hopper body 28. As the second portion of the grain spills over the rim 46 of the convergent cone 40, it falls into a second flow zone F2 located radially outside the convergent cone 40 but inside the intermediate funnel 54. As the second zone F2 fills with grain, a portion of the grain will spill over a rim 56 of the intermediate funnel 54 into a third flow zone F3 located radially outward of the intermediate funnel 54 but inside the hopper body 28. Thus, this funnel within a funnel design creates multiple flow zones (F1, F2 and F3) within the grain spreader 20.

In one embodiment, the spreader cone 38 is supported from the plurality of spreader arm support rods 32 with a plurality of support springs 60. As the spreader cone 38 not directly attached to the body of the hopper 22, the spring-loaded spreader cone 38 is able to move up and down in the outlet 30 of the hopper 22. This movement linearly up and down with respect to the hopper 22 enables flow between the plurality of flow zones F1, F2 and F3. In order to ensure that the grain cannot flow freely through the grain spreader 20 in sub-capacity flow rates, the support springs 60 enable the spreader cone 38 to act as a flow metering device. In one embodiment, compression of the support springs 60 is adjustable by mounting one end of the support springs 60 with a retainer pin 62 in a selected one of a plurality slots 64 for different retainer pin locations to selectable increase or decrease the no-load compression on the springs.

The hopper 22 further has a center flow choke 66 configured to selectively throttle the flow of the first portion of grain through the center opening 50. The center flow choke 66 may be a suspended ball or other feature configured to engage with the center opening 50 to partially close the center opening 50 in low grain flow conditions. Desirably, the center flow choke 66 is mounted to the hopper body 28 with hanger 68 such that up and down movement of the spreader cone 38 moves the center opening 50 into or out of engagement with the center flow choke 66. Desirably, the center flow choke 66 never completely cuts off flow of grain through the center opening 50, thereby enabling the prevention of grain from being trapped in the convergent cone 40. It is desirable that the convergent cone 40 empties completely when the flow of grain is terminated.

Figure 5:
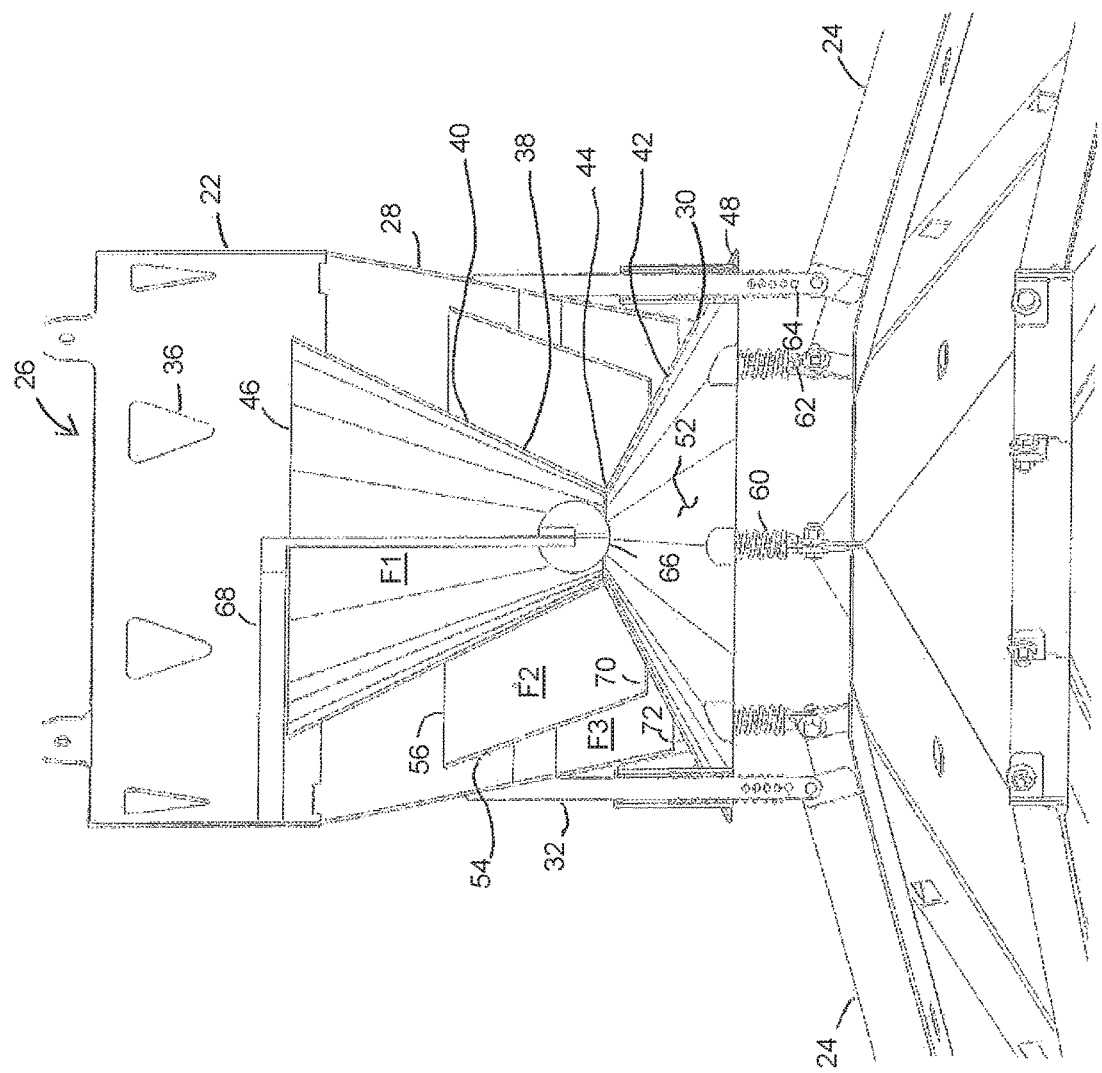
FIG. 5 is a sectional view of the receiving hopper in a choked down condition.
Figure 6:
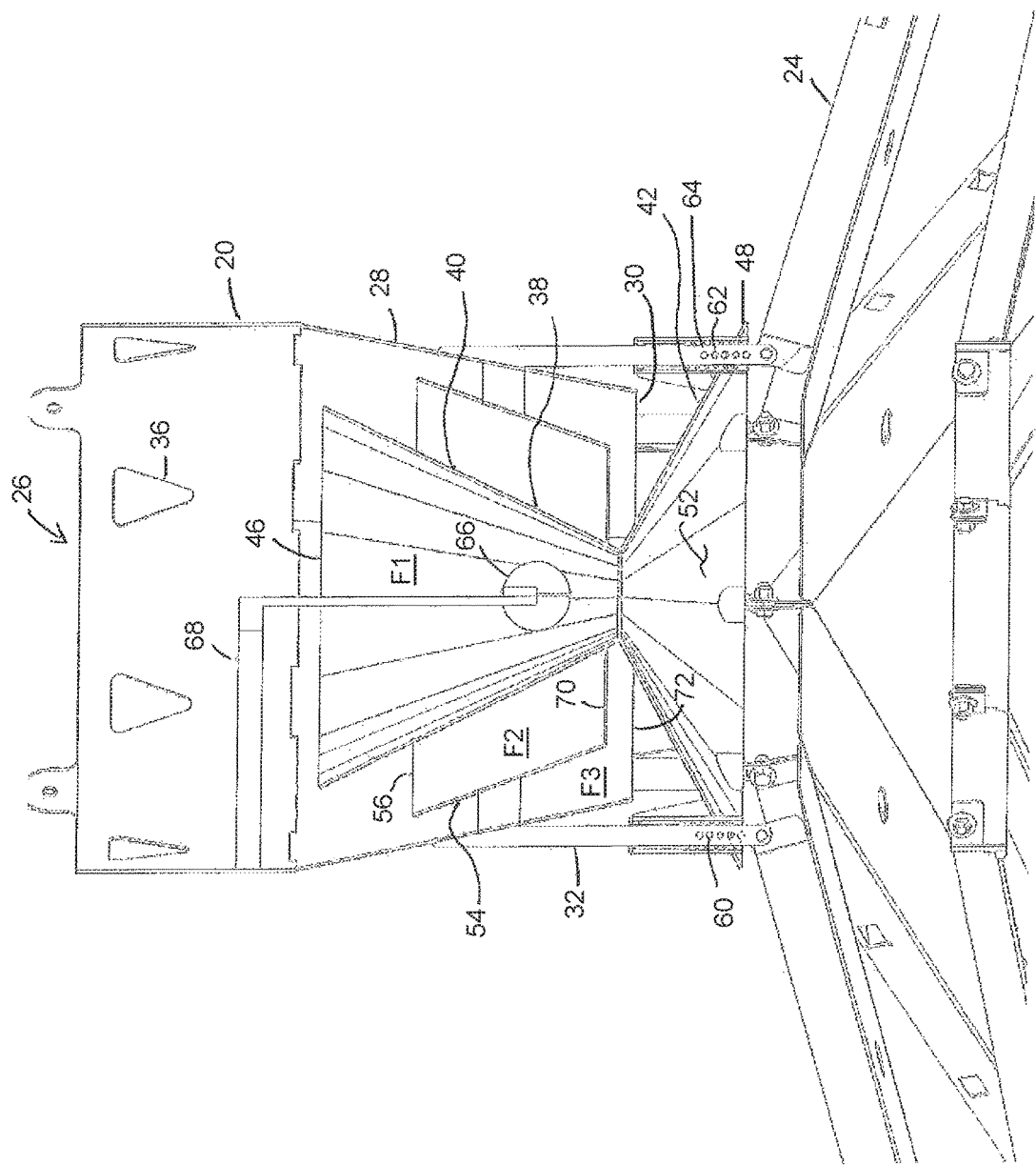
FIG. 6 is a sectional view of the receiving hopper in a full open condition.
Figure 7:
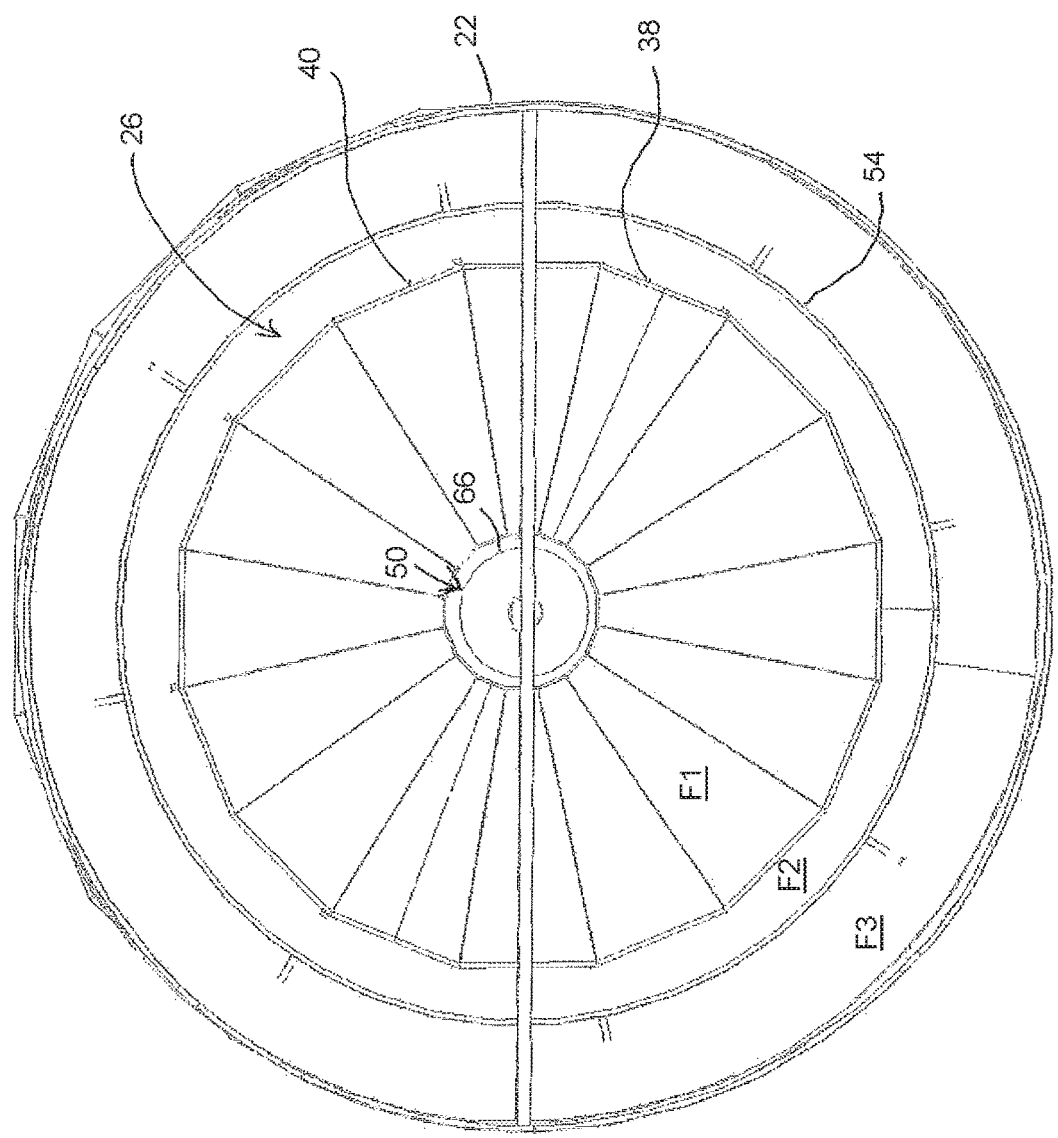
FIG. 7 is a plan view of the receiving hopper.

As best seen in FIG. 5, the support springs 60 lift the spreader cone 38 upwards into the hopper 22 when the spreader cone 38 is empty to lightly loaded. With the spreader cone 38 in the choked condition as shown in FIG. 5, the center flow choke 66 partially blocks the flow of grain through the center opening 50, causing more of the grain to collect in the first flow zone F1 in the convergent cone 40. When the grain begins to spill over the rim 46 of the convergent cone 40 into the second flow zone F2, the grain begins to collect above the upper surface 52 of the divergent cone 42 but is held within the second zone F2 because there is either a relatively small gap or no gap between a bottom edge 70 of the intermediate funnel 54 and the upper surface 52 of the divergent cone 42. As the amount of grain fills up the second flow zone F2, it will spill over the top edge 56 of the intermediate funnel 54 and into the third flow zone F3. While it is explained above that grain falling from the spout 14 will first fill up the first zone F1 and then flow over the rim 46 to the second zone and then over top edge 56 into the third zone F3, it is to be understood that some grain may fall directly into the second and third zones F2, F3 from the spout 14 without departing from the scope of the invention, The increasing weight of the grain in the second and third flow zones F2, F3 compresses the support springs 60 causing the spreader cone 38 to move from the choked condition shown in FIG. 5 to a full open condition as shown in FIG. 6. As the spreader cone 38 moves downward, the size of the gaps between the lower edge 70 of the intermediate funnel 54 and the divergent cone 42 and a lower edge 72 of the hopper body 28 and the divergent cone 42 increase allowing more grain to pass from the hopper 22 over the divergent cone 42 and onto the spreader arms 24. If the level in the third flow zone F3 continues to rise, grain spills through the overflow ports 36 to the spreader arms 24.

Thus, as the spreader cone 38 is additionally loaded with a higher grain flow, the increased weight compresses the support springs 60. This vertical, linear action of the spreader cone 38 allows the grain spreader 20 to produce a laminar output flow despite varying input flow rates from the elevator 12 by maintaining grain presence in each of the plurality of flow zones F1, F2, F3 of the grain spreader 20. Grain pushing through all of the plurality of flow zones F1, F2, F3 produces a substantially even flow over the divergent cone 42 in all directions to be distributed among the spreader arms 24. This metering requires no manual adjustment once installed within a directed throughput range of the grain spreader 20. The ability to choke the grain flow back to the point that it fills the plurality of flow zones F1, F2, F3 before exiting the hopper 22 over the divergent cone 42 increases the throughput capacity range. Desirably, the grain spreader 20 automatically adjusts to differing flow rates within its throughput capacity without the need for manual adjustment. Thus, the hopper 22 with a spreader cone 38 with the funnel inside of funnel design forces the incoming grain into the differing flow zones F1, F2, F3. These flow zones F1, F2, F3 impede the flow to the extent that if it builds up too much on one side, grain is redirected to the other side of the spreader cone 38 before passing through, thus forcing grain to flow evenly onto the divergent cone 42 and ultimately into the storage bin 16. It has been found that the funnel in funnel design works best when the flow zones are filled to the point that grain is being redirected internally. If grain inflow is slowed down below the throughput capacity of the grain spreader 20 due to a smaller auger or slower filling method, without moving the spreader cone 38 to the choked position, the grain can pass through the grain spreader 20 without being redirected, resulting in an uneven bin fill.

In one embodiment, the support springs 60 and support rods 32 are enclosed within protective tubing 80 with suitable seals to protect the springs and rods 32 from the environment and wear from impingement from grain.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention are obtained by referring to the detailed description of the exemplary embodiments taken in conjunction with the accompanying drawings.

The invention claimed is:

1. A grain spreader for a storage bin that receives grain from a spout through a bin inlet, the grain spreader comprising a hopper that receives grain from the spout and a plurality of spreader arms extending generally radially from the hopper configured to distribute the grain in the storage bin, the hopper having a body forming a constricted outlet at a bottom end of the hopper body, the grain spreader further comprising:
 a spreader cone, wherein grain received in the hopper is directed to the plurality of spreader arms through the outlet with the spreader cone, the spreader cone having an upper portion comprising a convergent cone and lower portion comprising a divergent cone connected at a middle union, the spreader cone being positioned partially within the body of the hopper such that an upper rim of the convergent cone is within and coaxially aligned with the hopper body, and a bottom or distribution end of the divergent cone is suspended below the outlet of the hopper, wherein grain being fed into the hopper falls into the convergent cone and an interior of the convergent cone forms a first flow zone, wherein the spreader cone has a center opening between the convergent cone and the divergent cone that allows a first portion of the grain collecting in the convergent cone to pass through the interior of the spreader cone and fall through the underside of the divergent cone;
 an intermediate funnel inside the hopper body and positioned between the convergent cone and the hopper body; and
 wherein a second portion of the grain collecting in the convergent cone spills over the rim of the convergent cone and onto an upper surface of the divergent cone into a second flow zone located radially outside the convergent cone but inside the intermediate funnel to fill the second flow zone, and when the second flow zone fills with grain, a further portion of the grain will spill over a rim of the intermediate funnel into a third flow zone located radially outward of the intermediate funnel but inside the hopper body.

2. The grain discharge spreader system of claim 1 wherein the flow zones direct the flow of grain such that when grain builds up more on one side of the hopper, grain is redirected to the other side of the hopper to cause the grain to flow evenly onto the divergent cone.

3. The grain spreader of claim 1 further comprising a plurality of support springs configured to move the spreader cone up and down in the outlet of the hopper based on a weight of the grain in the convergent cone of the spreader cone, wherein the support springs are biased to lift the spreader cone upwards into the hopper when the spreader cone is empty to lightly loaded.

4. The grain discharge spreader system of claim 3 wherein as the spreader cone moves downward as caused by an increasing weight of grain in the convergent cone of the spreader cone, the size of a gap between a lower edge of the intermediate funnel and the divergent cone and the size of a gap between a lower edge of the hopper body and the divergent cone increase allowing more grain to pass from the hopper over the divergent cone and into the spreader arms.

5. The grain spreader of claim 4 further comprising a center flow choke configured to selectively throttle the center flow of grain through the center opening to partially close the center opening when the support springs lift the spreader cone in low grain flow conditions, wherein the center flow choke is mounted to the hopper body such that up and down movement of the spreader cone moves the center opening into or out of engagement with the center flow choke.

6. The grain discharge spreader system of claim 5 wherein with the spreader cone in a choked condition, the center flow choke partially blocks the flow of grain through the center opening, causing grain to collect in the convergent cone and to spill over the rim of the convergent cone and onto an upper surface of the divergent cone.

7. The grain discharge spreader system of claim 6 wherein grain collecting on the top surface of the divergent cone causes the support springs to compress and move the spreader cone from the choked condition to a full open condition.

8. The grain discharge spreader system of claim 7 wherein the center flow choke is mounted to the hopper body such that up and down movement of the spreader cone moves the center opening into or out of engagement with the center flow choke.

9. The grain discharge spreader system of claim 5 wherein in a choked condition, the center flow choke is configured to permit the flow of some grain through the center opening such that the convergent cone is able to empty completely when the flow of grain is terminated.

10. The grain discharge spreader system of claim 3 wherein the spreader arms are hung from and supported by the body of the hopper using a plurality of support rods.

11. The grain discharge spreader system of claim 10 wherein the spreader cone is supported from the plurality of spreader arm support rods with the plurality of support springs.

12. The grain discharge spreader system of claim 3 wherein compression of the support springs is adjustable by mounting one end of the support springs with a retainer pin in a selected one of a plurality slots for different retainer pin locations to selectable increase or decrease a no-load compression on the springs.

13. The grain discharge spreader system of claim 1 wherein the hopper body has an upward facing mouth and a frustoconical shape forming the constricted outlet at the bottom end of the hopper body.

14. The grain discharge spreader system of claim 1 wherein the spreader cone is coaxially aligned with the hopper.

\* \* \* \* \*